(12) United States Patent
Arvin

(10) Patent No.: US 6,279,741 B1
(45) Date of Patent: Aug. 28, 2001

(54) CORDLESS POWER TOOL HOLDER

(75) Inventor: Jerome M. Arvin, Springville, IN (US)

(73) Assignee: Plumbing 2000, Inc., Bedford, IN (US)

( * ) Notice: Subject to any disclaimer, the term of this patent is extended or adjusted under 35 U.S.C. 154(b) by 0 days.

(21) Appl. No.: 09/553,456

(22) Filed: Apr. 19, 2000

(51) Int. Cl.$^7$ .................................................. A45C 11/26
(52) U.S. Cl. ......................... 206/349; 248/210; 224/904; 211/70.6
(58) Field of Search .................................... 206/349, 486, 206/490; 211/70.6; 248/210, 291.1; 220/729, 735, 737, 903; 224/904

(56) References Cited

U.S. PATENT DOCUMENTS

| | | |
|---|---|---|
| 1,338,106 | 4/1920 | Smith . |
| 1,672,033 | 6/1928 | Mallins . |
| 2,213,738 | 9/1940 | Larsen . |
| 2,297,193 | 9/1942 | Silverman . |
| 3,482,809 | 12/1969 | McCall, Jr. . |
| 3,895,710 | 7/1975 | Harvell . |
| 4,036,463 * | 7/1977 | Hopkins et al. ...................... 248/210 |
| 4,446,972 * | 5/1984 | Sussman .............................. 211/70.6 |
| 4,703,852 | 11/1987 | Verdier . |
| 4,714,162 * | 12/1987 | Harrison ............................... 248/210 |
| 4,917,239 | 4/1990 | Smith . |
| 4,917,281 | 4/1990 | Ostermiller . |
| 4,998,698 * | 3/1991 | Martinson ........................... 211/70.6 |
| 5,028,023 | 7/1991 | Allen . |
| 5,333,823 * | 8/1994 | Joseph ................................... 248/210 |
| 5,542,553 * | 8/1996 | Penniman ........................... 211/70.6 |
| 6,000,669 | 12/1999 | Seward et al. . |
| 6,059,138 * | 5/2000 | Labruyere ........................... 220/737 |

\* cited by examiner

*Primary Examiner*—David T. Fidei
(74) *Attorney, Agent, or Firm*—Ice Miller; Jay G. Taylor; Michael A. Swift

(57) ABSTRACT

A holder for a cordless power tool having a battery pack, the holder arranged and constructed to receive and retain the cordless power tool in an upright orientation, the holder comprising a plate member having a periphery, a top side, and a bottom side, means for attaching the plate member to a supporting surface, and at least one side wall joined to the periphery of the plate member, the at least one side wall extending upwardly from the periphery and having a top edge, the top edge having at least one notch, such that when the cordless power tool is placed battery pack first into the cordless power tool holder, the at least one notch aligns with the cordless power tool's battery pack release and the cordless power tool is positioned an upright orientation with the cordless power tool battery pack resting on the plate member's top side and being surrounded and gripped by the at least one side wall.

20 Claims, 5 Drawing Sheets

CORDLESS POWER TOOL HOLDER

BACKGROUND

This invention relates to power tool holders and in particular to a cordless power tool holder that may be used to support a cordless power tool while a worker uses the cordless power tool to perform a task or to store the cordless power tool between uses.

Since the introduction of the cordless power tool, use of these power tools has exploded in the construction industry. Cordless power tools, including, but not limited to, drills, circular saws, reciprocating saws, jig saws, screw guns, nailers and hammer drills are used by commercial contractors, home builders and the average "do-it-yourselfer." In fact, some contractors have totally forsaken traditional electric power tools with their power cords and often inconvenient need to have access to an electrical power source for the modem cordless power tool. However, the modem cordless power tool has certain disadvantages. For example, because the cordless power tools require a battery pack, the cordless power tool is often heavier and more unwieldy in use than traditional corded power tools.

Many jobs require the use of a cordless power tool in one hand while holding a work piece in the other hand. Again because of the bulky and unwieldy nature of the cordless power tool, such jobs are not only awkward but they are also tiring. For example, a cordless drill tool can be used with a brush attachment to clean open ends of copper pipe prior to soldering. The worker holds the cordless drill in one hand and the copper pipe in the other and cleans the end of the copper pipe. If there are only one or two solder connections to be made, the worker can easily accomplish the task without becoming tired. However, in large jobs such as in the case of hotels and motels, where there are hundreds of solder joints, the process of cleaning the ends of copper pipe with the cordless power tool can become overwhelming. Because of the bulk, shape, and weight of a typical cordless power tool, a worker's hand, wrist and arm are more likely to tire through prolonged use. In such a work environment, frequent breaks are required to rest the arm.

Moreover, because of the shape, size and balance of typical cordless power tools, traditional tool belts or belted power tool holders are not suitable for safely storing a cordless power tool. This can be particularly troublesome when a worker is performing tasks while on a ladder or scaffolding. Because there is no suitable and safe place to store a typical cordless power tool while on a ladder, cordless power tools are often dropped by the worker between uses while working on a ladder. As a result, cordless power tools are often damaged, sometimes beyond repair, by workers while working on a ladder. Moreover, cordless power tools dropped from ladders or scaffolding have resulted in injury to workers working or walking below ladders or scaffolding. A current method of overcoming these particular safety-related issues is to require the worker to descend from the ladder and store the cordless power tool on the ground when not in use. Under this approach, a worker will therefore have to make numerous trips up and down ladders to their work area to pick up and return cordless power tools.

Thus, what is needed is a device to overcome the deficiencies discussed above. Such a device must be able to support a cordless power tool in an upright position while allowing a worker to actuate the power tool without having to bear the weight and unwieldiness of the cordless power tool in the worker's hand, wrist and arm. A device is also needed to allow a worker to safely store a cordless power tool while working for instance on a ladder to minimize the potential for dropping the cordless power tool and minimize the need to go up and down the ladder to retrieve and return a cordless power tool to the ground.

SUMMARY

In accordance with the present invention, a cordless power tool holder is provided that solves the deficiencies inherent in traditional uses of cordless power tools. The present invention can support a cordless power tool in an upright position in use or be used to safely store the cordless power tool when not in use, such as when a worker is working on a ladder or scaffolding.

In accordance with the present invention, the cordless power tool holder includes a plate member having a periphery, a top side, and a bottom side. The plate member also includes at least one opening there through extending perpendicularly from the top side to the bottom side, such that fasteners may be inserted through the at least one opening from the top side to the bottom side and into a supporting surface. Thus, the cordless power tool holder can be secured to a work area.

The cordless power tool holder further comprises at least one side wall joined to the periphery of the plate member and extending upwardly from the periphery. The at least one side wall includes a top edge, the top edge having at least one notch. When the cordless power tool is placed battery pack first into the cordless power tool holder, the cordless power tool is positioned in an upright orientation with the cordless power tool's battery pack resting on the plate member's top side and being surrounded and gripped by the at least one side wall. Further, when the cordless power tool is resting in the cordless power tool holder, the at least one notch aligns with the cordless power tool's battery release mechanism.

The at least one side wall further includes a first slot and a second slot, the slots located in close proximity to the plate member. The first slot is positioned directly opposite the second slot and the first and second slots are dimensioned to receive a band. The band has a first end, a second end and means for locking the first end to the second end. The band may be fed into the first slot and second slot such that the first end extends from one of the slots and the second end extends from the opposite slot. A worker can wrap the first end and second end around an object, such as a ladder rung, and attach and tighten the first end and second end together around the object using the locking means, thereby securing the cordless power tool holder to the object and allowing the worker to safely store the cordless power tool in the cordless power tool holder until needed.

Thus, when the present invention is fastened to a work surface such as a table top, a worker can place a cordless power tool into the cordless power tool holder. The cordless power tool holder now supports the weight of the power tool rather than the worker's hand, wrist and arm. A worker may actuate a cordless power tool, such as a drill with a cleaning brush, with one hand and hold a work piece such as a copper pipe that he is cleaning with the other hand. Through this use of the invention, a worker can clean hundreds of copper pipe ends in a shorter time period because the worker does not have to take frequent breaks to rest his arm.

A worker can also use the present invention to safely store a cordless power tool while the worker is on a ladder. When the invention is used in this manner, a worker can place the cordless power tool in the cordless power tool holder while working on a ladder between uses of the cordless power tool. The potential for dropping the cordless power tool and damaging the cordless power tool or injuring a co-worker is thereby minimized. Further, the number of trips required up and down the ladder is also minimized through use of the present invention. Thus, the present invention saves time, reduces costs, and enhances job site safety.

These and other advantages and features of the present invention shall hereinafter appear, and for the purposes of illustration, but not limitation, exemplary embodiments of the present invention shall hereinafter be described.

DETAILED DESCRIPTION

Figure 1:
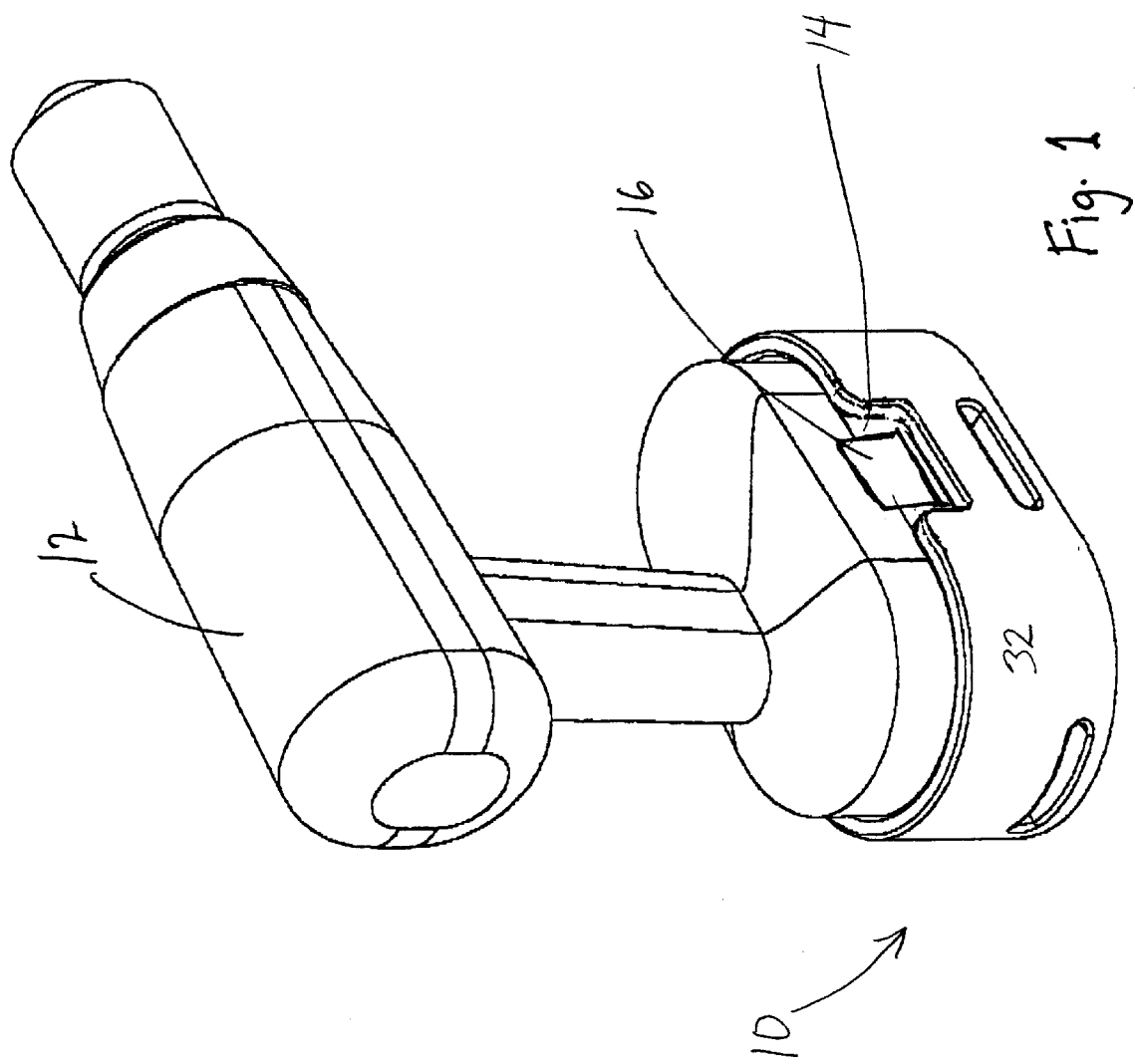
FIG. 1 is a perspective view of the cordless power tool holder retaining a cordless drill.

In accordance with the present invention, a cordless power tool holder is provided as shown generally in FIGS. 1 through 5 and is generally indicated by the numeral 10. FIG. 1 shows a cordless power tool holder 10 in combination with a cordless drill 12 having a battery pack 14 and battery pack release 16. As will be described more fully herein, the cordless power tool holder 10 is arranged and constructed to receive and grip the battery pack of a cordless power tool such as a drill without activating the battery pack release. Additionally, the present invention can be used in combination with any typical cordless power tool, including, but not limited, circular saws, reciprocating saws, jig saws, screw guns, nail guns, and hammer drills.

Figure 3:
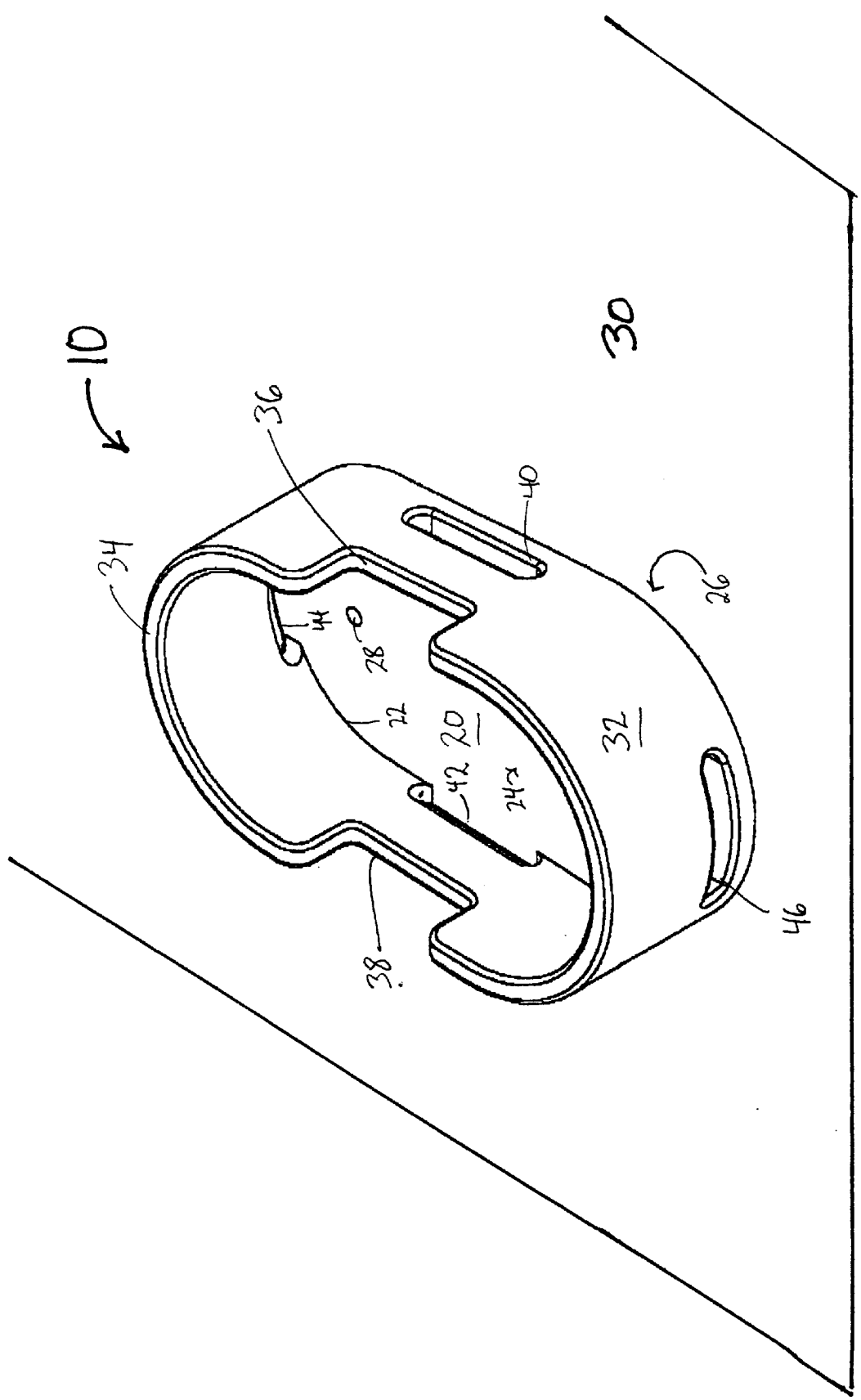
FIG. 3 is a perspective view of the cordless power tool holder without band.

In accordance with the present invention, and referring to FIG. 3, the cordless power tool holder includes a plate member 20 having a periphery 22, a top side 24, and a bottom side 26. The plate member 20 further includes at least one opening 28 there through extending perpendicularly from the top side 24 to the bottom side 26. Fasteners such as screws or any other fastener as is common in the art may be inserted through the at least one opening 28 from the top side 24 to the bottom side 26 and into a supporting surface 30 hereby releasably securing the cordless power tool holder 10 to the supporting surface.

Referring to FIG. 3, the cordless power tool holder 10 further includes a continuous side wall 32 joined to and extending upwardly from the periphery 22 of plate member 20. The side wall 32 is contoured to receive and grip the battery pack of a cordless power tool. The side wall 32 includes a top edge 34 having opposing notches 36, 38 as shown in FIG. 3. The side wall 32 and plate member 20 may be formed and constructed into a unitary, one piece structure by use of common molding processes, including, but not limited to, injection molding. Alternatively, the side wall 32 and plate member 20 may be separate pieces joined together in any manner common in the art to form the present invention.

Figure 5:
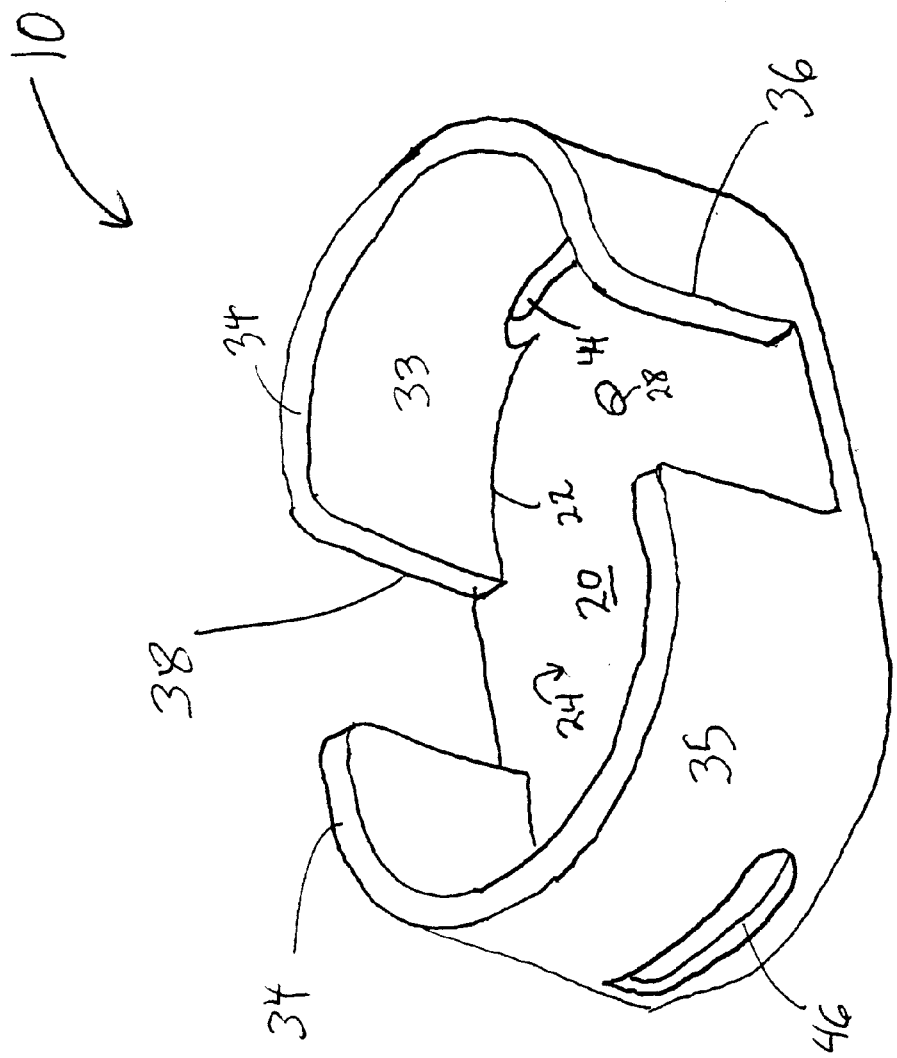
FIG. 5 is a perspective view of an alternate embodiment of the cordless power tool holder.

The side wall 32 shown in FIG. 3 is generally continuous around the periphery. However, as shown in FIG. 5, the present invention may be arranged and constructed such that more than one side wall or a side wall with multiple portions extends upwardly from the periphery. In such an embodiment, notches 36 and 38 essentially extend from the top side 24 of the plate number 20 to the top edge 34 of side walls 33 and 35.

Referring to FIG. 1, when a cordless power tool such as a cordless drill 12 is placed battery pack 14 first into the cordless power tool holder 10, the cordless drill 12 is positioned in an upright orientation with the cordless drill's battery pack 14 resting on the plate member's top side 24 and being surrounded and gripped by the side wall 32. When the cordless drill 12 is inserted into the cordless power tool holder 10 as described above, the cordless drill's battery pack release 16 align with notches 36, 38, thereby preventing unwanted actuation of the battery pack release buttons by the side wall 32 the cordless drill 12 is inserted into and removed from the cordless power tool holder 10.

The side wall 32 further includes, a series of four slots 40, 42, 44, 46. The slots are located in close proximity to the plate member 20 with the first slot 40 positioned directly opposite the second slot 42 and the third slot 44 positioned directly opposite the fourth slot 46. The slots are dimensioned and positioned to receive a band 48. The band 48 has a first end 50, a second end 52, and means for locking 54 the first end 50 to the second end 52. The band 48 may be fed into the first slot 40 and second slot 42 or the third slot 44 and fourth slot 46 such that the first end 50 extends from one of the slots and the second end 52 extends from the opposite slot.

Figure 2:
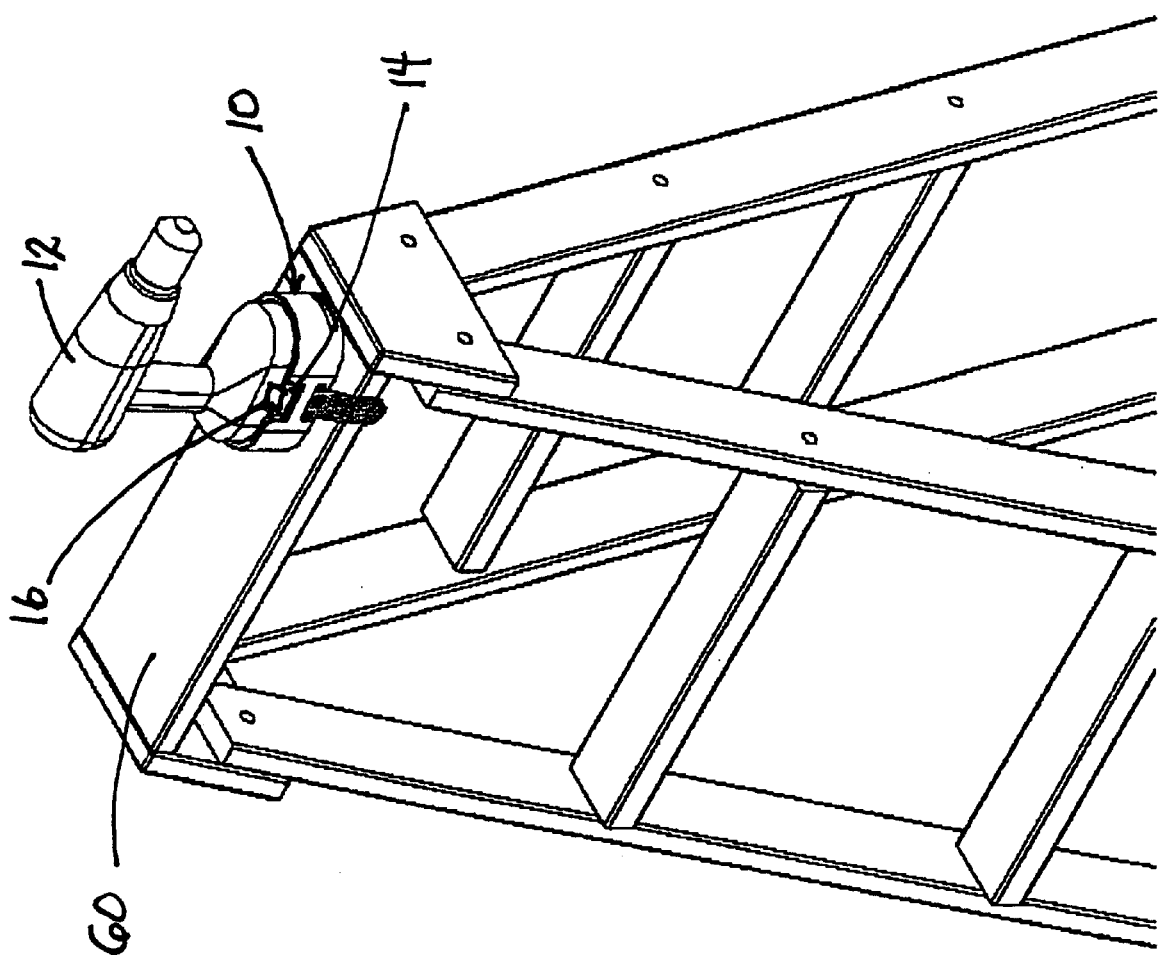
FIG. 2 is a perspective view of the cordless power tool holder retaining a drill on a ladder.
Figure 4:
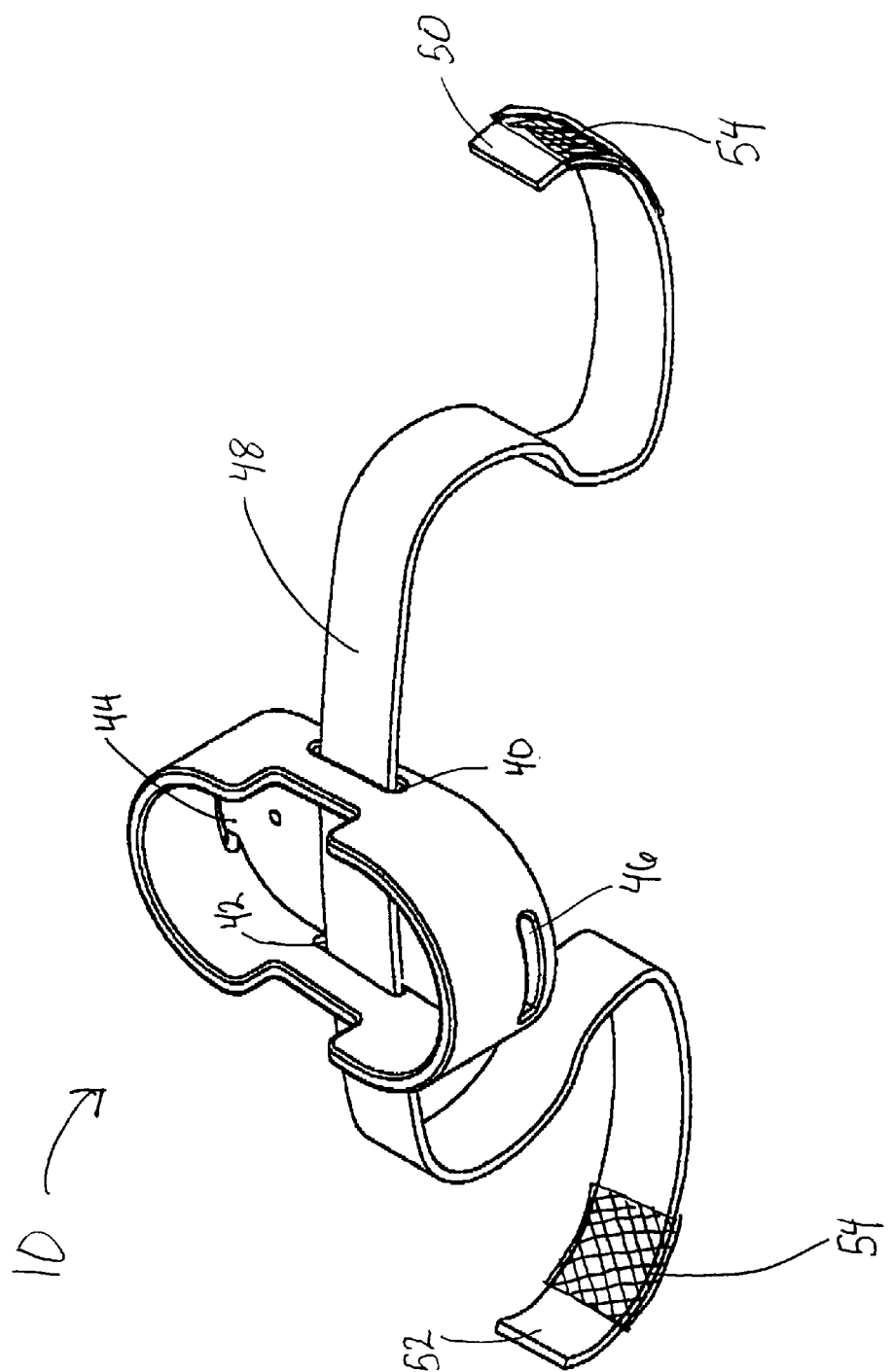
FIG. 4 is a perspective view of the cordless power tool holder with a band.

Referring to FIG. 2 and FIG. 4, a worker can wrap the first end 50 and second end 52 around an object, such as a ladder top 60 and tighten the first end 50 second end 52 together around the ladder top 60 using the locking means 54, thereby securing the cordless power tool holder 10 to the ladder top 60 and allowing the worker to safely store the cordless power tool in the cordless power tool holder until needed. The locking means can be any device for joining the first and second ends as is common in the art. Such locking means, includes, but is not limited to, a buckle, snaps, velcro, or a releasable ratchet lock.

In an alternate embodiment of the cordless power tool holder (not shown in any figure), the plate member further includes a passageway extending diametrically through the plate member and perpendicularly with respect to the at least one opening. The passageway includes diametrically opposed first and second openings. The passageway is dimensioned to receive a band there through. The band includes a first end, a second end, and means for locking the first end to the second end. The band may be fed through the passageway so that the first and second ends extend out of the passageway's openings. A worker can wrap the first end and second end around an object, attach and tighten the first end and second end together around the object using the locking means, thereby securing the cordless power tool holder to the object and allowing the worker to safely store the cordless power tool in the cordless power tool holder until needed.

As can be readily seen, the present invention eliminates the deficiencies associated with using today's cordless power tools. The cordless power tool holder may be used to support and retain a cordless power tool in an upright position so that a worker can use the cordless power tool with one hand while supporting a work piece in another hand. The worker's efficiency is enhanced because the worker can work longer without taking a break because the worker's arm no longer needs to support the cordless power tool. Moreover, the cordless power tool holder can be used to support and retain a cordless power tool while a worker is on a ladder by strapping the cordless power tool holder to the rung of the ladder. Thus, the worker while working on the ladder can safely store the cordless power tool in the cordless power tool holder. The potential for dropping the cordless power tool is minimized thus saving the worker the expense of repairing or replacing dropped tools. Further, safety is enhanced because the potential for dropping the cordless power tool on an unsuspecting worker below is minimized.

Although other advantages may be found and realized and various modifications may be suggested by those skilled in the art, it is understood that the present invention is not to be limited to the details given above, but rather may be modified within the scope of the appended claims.

I claim:

1. A holder for a cordless power tool having a battery pack, the holder arranged and constructed to receive and retain the cordless power tool in an upright orientation, the holder comprising:
   (a) a plate member having a periphery, a top side, and a bottom side;
   (b) means for attaching the plate member to a supporting surface; and
   (c) at least one side wall joined to the periphery of the plate member, the at least one side wall extending upwardly from the periphery and having a top edge, the top edge having at least one notch, such that when the cordless power tool is placed battery pack first into the cordless power tool holder, the at least one notch aligns with the cordless power tool's battery pack release and the cordless power tool is positioned in an upright orientation with the cordless power tool battery pack resting on the plate member's top side and being surrounded and gripped by the at least one side wall.

2. The cordless power tool holder at claim 1 wherein the means for attaching comprises at least one opening in the plate member, the at least one opening extending perpendicularly from the top side to the bottom side, such that fasteners may be inserted through the at least one opening from the top side to the bottom side and into a supporting surface, thereby releasably securing the cordless power tool holder to the supporting surface.

3. The cordless power tool holder of claim 1 wherein the means for attaching comprises a first slot and a second slot, the slots located in the at least one side wall in close proximity to the plate member, the first slot positioned directly opposite the second slot, the first and second slots dimensioned to receive a band, the band having a first end, a second end, and means for locking the first end to the second end whereby the band may be fed into the first slot and second slot such that the first end extends from one of the slots and the second end extends from the opposite slot and a worker can wrap the first end and second end around an object, attach and tighten the first end and second end together around the object using the locking means, thereby securing the cordless power tool holder to the object and allowing the worker to safely store the cordless power tool in the cordless power tool holder until needed.

4. The cordless power tool holder of claim 1 wherein the means for attaching comprises a passageway extending diametrically through the plate member between the top side and the bottom side, the passageway having diametrically opposed first and second openings, the passageway dimensioned to receive a band there through, the band having a first end, a second end, and means for locking the first end to the second end, whereby the band may be fed through the passageway so that the first and second ends extend out of the passageway's openings and a worker can wrap the first end and second end around an object, attach and tighten the first end and second end together around the object using the locking means, thereby securing the cordless power tool holder to the object and allowing the worker to safely store the cordless power tool in the cordless power tool holder until needed.

5. The cordless power tool holder of claim 1, wherein the plate member and the at least one side wall are a unitary one piece molding.

6. The cordless power tool holder of claim 3, wherein the at least one side wall further includes a third slot and a fourth slot, the slots located in close proximity to the plate member, the third slot positioned directly opposite the fourth slot, the third and fourth slots dimensioned to receive the band, whereby the band may be fed into the third slot and fourth slot such that the first end extends from one of the slots and the second end extends from the opposite slot and a worker can wrap the first end and second end around an object, attach and tighten the first end and second end together around the object using the locking means, thereby securing the cordless power tool holder to the object and allowing the worker to safely store the cordless power tool in the cordless power tool holder until needed.

7. The cordless power tool holder of claim 2, wherein the plate member and the at least one side wall are a unitary one piece molding.

8. The cordless power tool holder of claim 3, wherein the plate member and the at least one side wall are a unitary one piece molding.

9. The cordless power tool holder of claim 4, wherein the plate member and the at least one side wall are a unitary one piece molding.

10. The cordless power tool holder of claim 6 wherein the plate member and the at least one side wall are a unitary one piece molding.

11. In combination, a cordless power tool having a battery pack and battery pack release and a cordless power tool holder for use by a worker to safely receive and retain the cordless power tool, the cordless power tool holder comprising:
    (a) a plate member having a periphery, a top side, and a bottom side;
    (b) means for attaching the plate member to a supporting surface; and
    (c) at least one side wall in contact with the periphery of the plate member, the at least one side wall extending upwardly from the periphery and having a top edge, the top edge having at least one notch, such that when the cordless power tool is placed battery pack first into the cordless power tool holder, the at least one notch aligns with the cordless power tool's battery pack release and the cordless power tool is positioned in an upright orientation with the cordless power tool battery pack resting on the plate member's top side and being surrounded and gripped by the at least one side wall.

12. The combination of claim 11 wherein the means for attaching comprises at least one opening in the plate member, the at least one opening extending perpendicularly from the top side to the bottom side, such that fasteners may be inserted through the at least one opening from the top side to the bottom side and into a supporting surface, thereby releasably securing the cordless power tool holder to the supporting surface.

13. The combination of claim 11, wherein the means for attaching comprises a first slot and a second slot, the slots located in the at least one side wall in close proximity to the plate member, the first slot positioned directly opposite the second slot, the first and second slots dimensioned to receive a band, the band having a first end, a second end, and means for locking the first end to the second end whereby the band may be fed into the first slot and second slot such that the first end extends from one of the slots and the second end extends from the opposite slot and a worker can wrap the first end and second end around an object, attach and tighten the first end and second end together around the object using the locking means, thereby securing the cordless power tool holder to the object and allowing the worker to safely store the cordless power tool in the cordless power tool holder until needed.

14. The combination of claim 11, wherein the means for attaching comprises a passageway extending diametrically through the plate member between the top side and the bottom side, the passageway having diametrically opposed first and second openings, the passageway dimensioned to receive a band there through, the band having a first end, a second end, and means for locking the first end to the second end, whereby the band may be fed through the passageway so that the first and second ends extend out of the passageway's openings and a worker can wrap the first end and second end around an object, attach and tighten the first end and second end together around the object using the locking means, thereby securing the cordless power tool holder to the object and allowing the worker to safely store the cordless power tool in the cordless power tool holder until needed.

15. The combination of claim 11, wherein the plate member and the at least one side wall are a unitary one piece molding.

16. The combination of claim 12, wherein the plate member and the at least one side wall are a unitary one piece molding.

17. The combination of claim 13 wherein the at least one side wall further includes a third slot and a fourth slot, the slots located in close proximity to the plate member, the third slot positioned directly opposite the fourth slot, the third and fourth slots dimensioned to receive the band, whereby the band may be fed into the third slot and fourth slot such that the first end extends from one of the slots and the second end extends from the opposite slot and a worker can wrap the first end and second end around an object, attach and tighten the first end and second end together around the object using the locking means, thereby securing the cordless power tool holder to the object and allowing the worker to safely store the cordless power tool in the cordless power tool holder until needed.

18. The combination of claim 13, wherein the plate member and the at least one side wall are a unitary one piece molding.

19. The combination of claim 14, wherein the plate member and the at least one side wall are a unitary one piece molding.

20. The combination of claim 17, wherein the plate member and the at least one side wall are a unitary one piece molding.

\* \* \* \* \*